Figure 14:
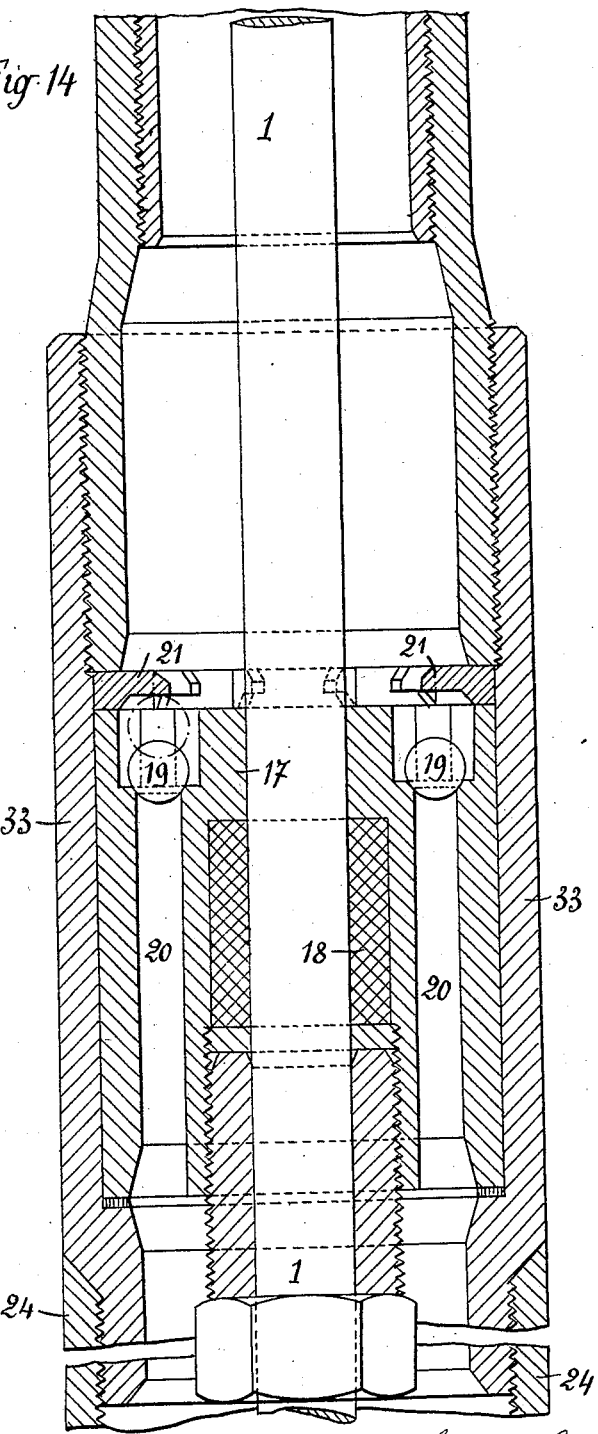

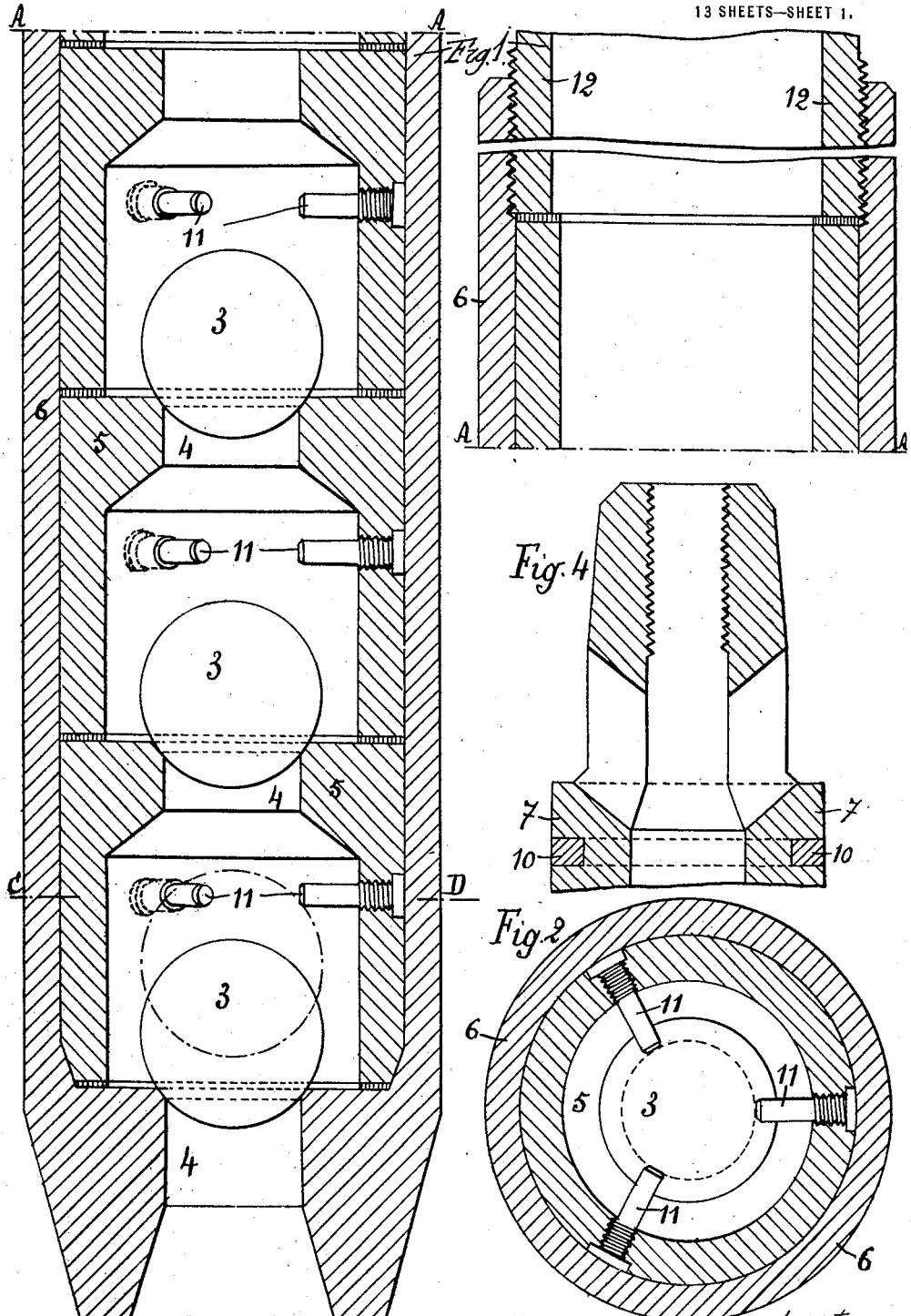

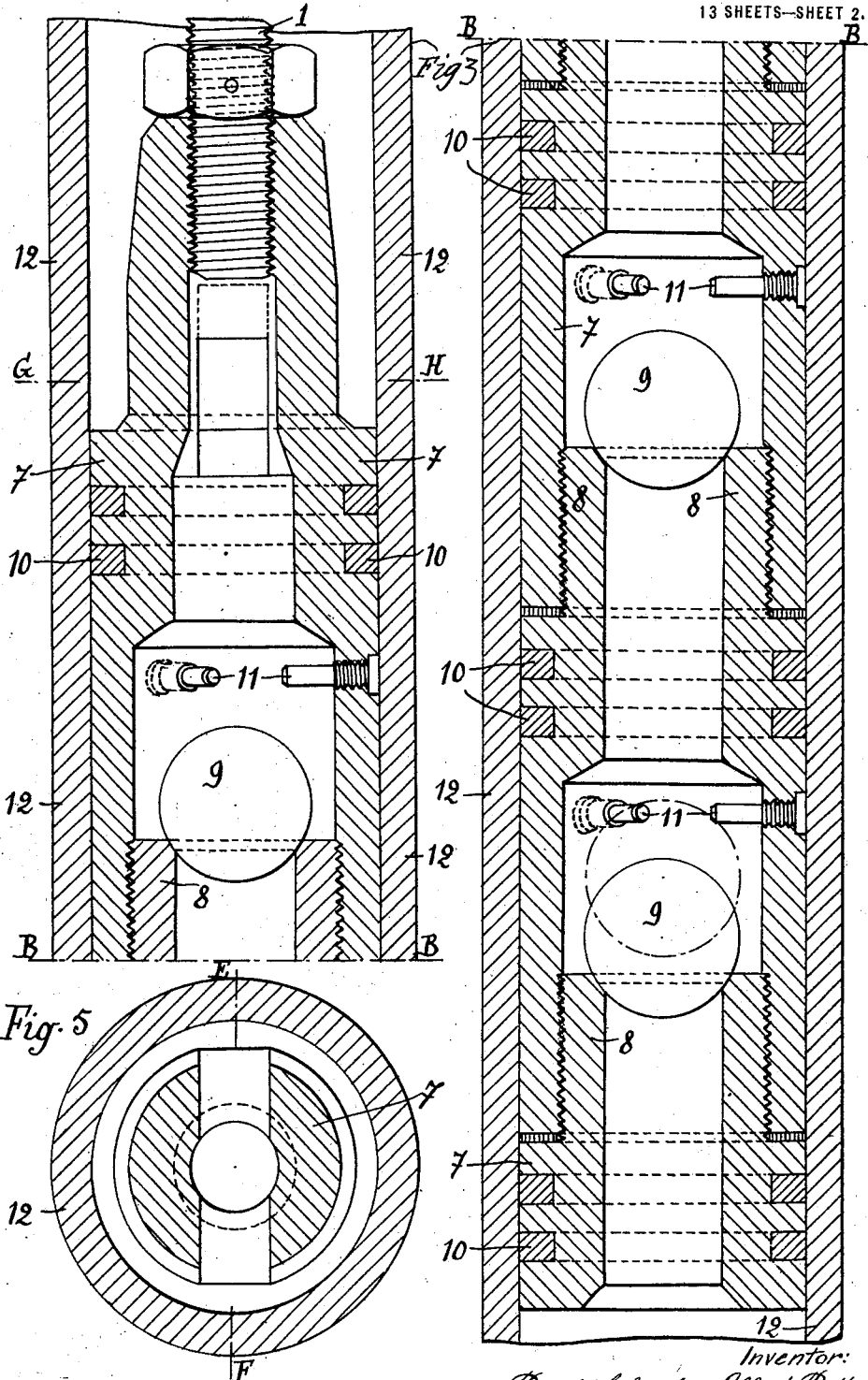

P. C. A. ROTTELEUR.
DEEP WELL PUMP.
APPLICATION FILED MAY 21, 1919.
1,388,602.
Patented Aug. 23, 1921.
13 SHEETS—SHEET 3.
Fig. 6
Fig. 7
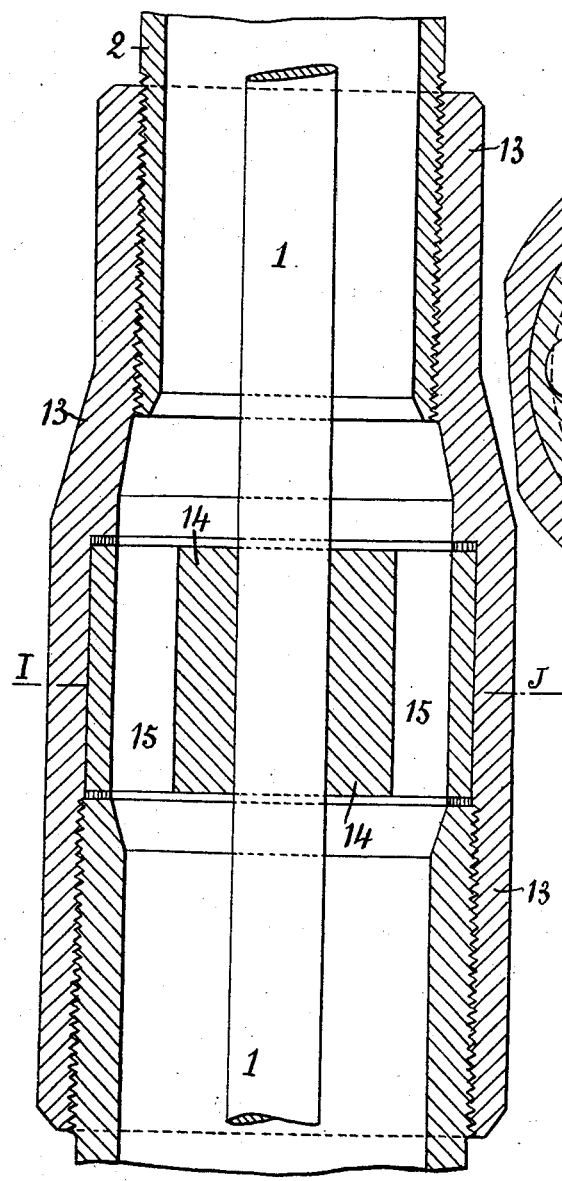
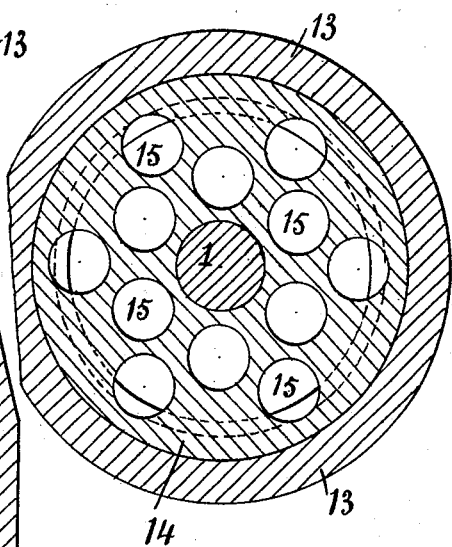
Inventor:
Paul Charles Albert Rotteleur
By Attys.
Fraser, Dink & Myers P. C. A. ROTTELEUR.
DEEP WELL PUMP.
APPLICATION FILED MAY 21, 1919.
1,388,602.
Patented Aug. 23, 1921.
13 SHEETS—SHEET 4.
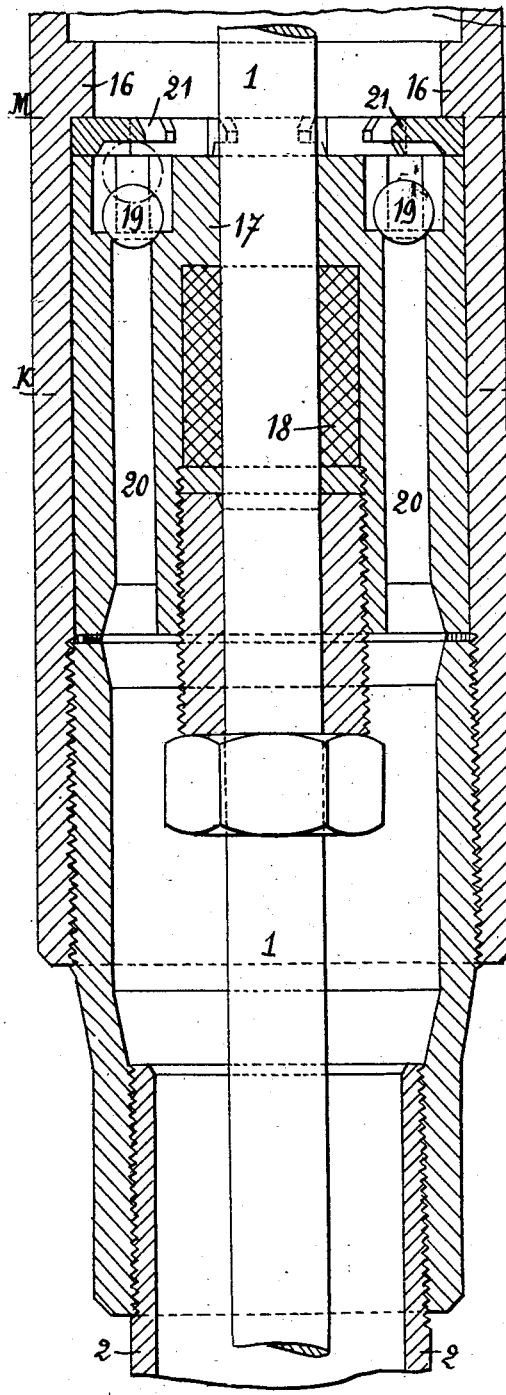
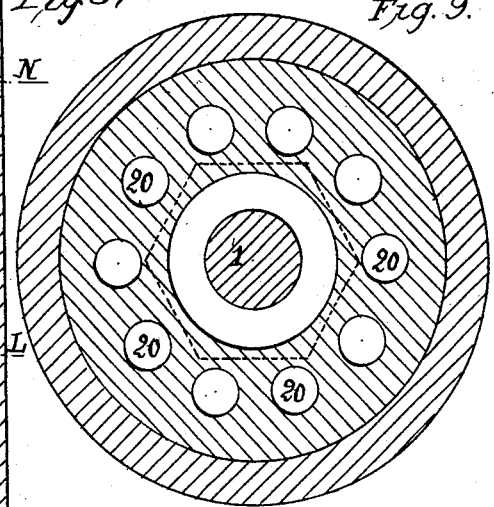
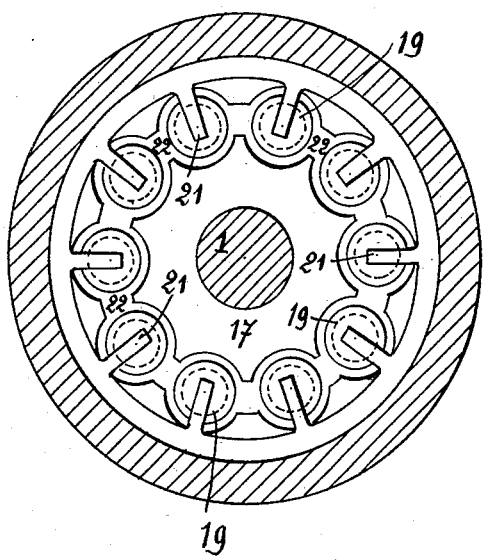
Inventor
Paul Charles Albert Rotteleur
By Attys
Fraser Dusk & Myers

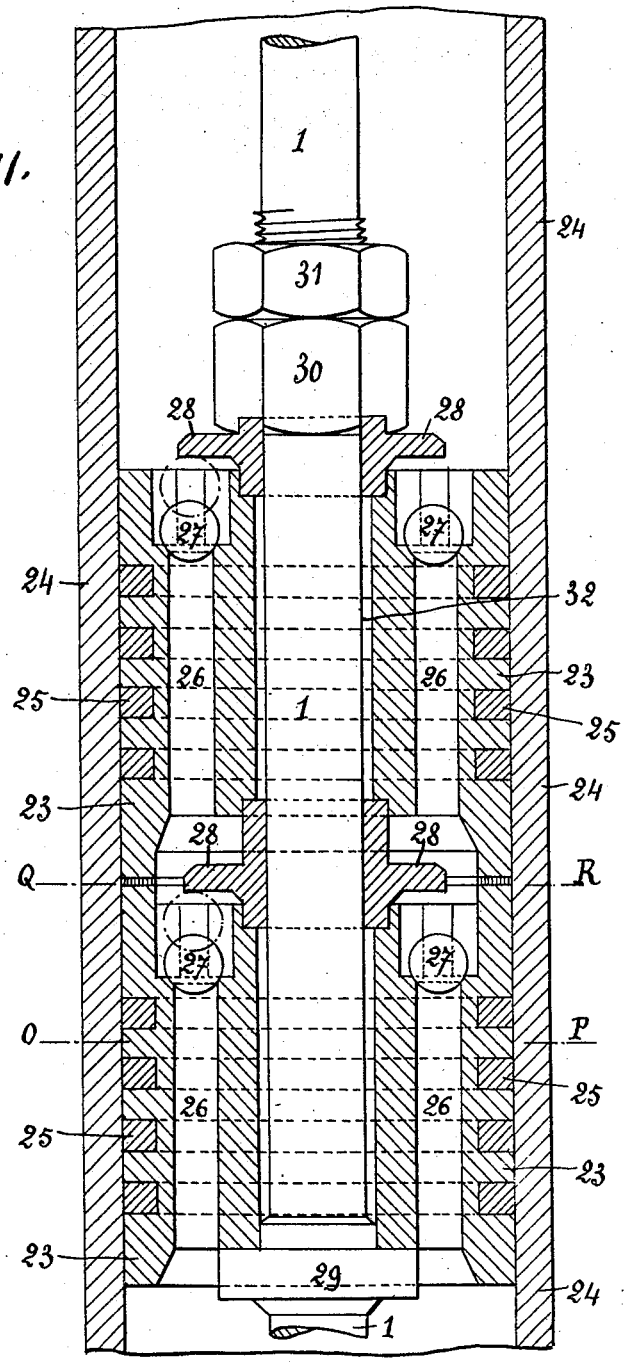

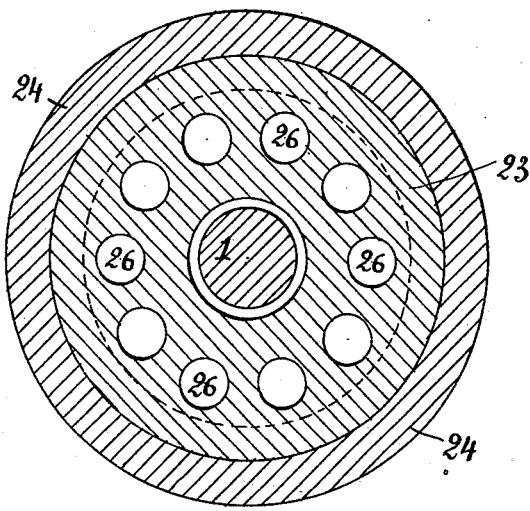
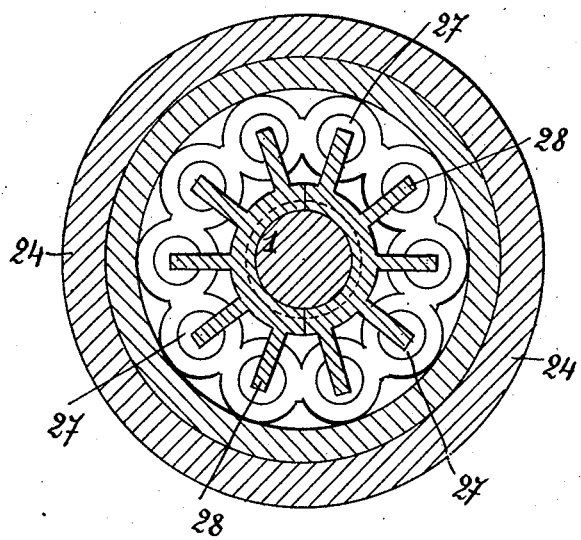

P. C. A. ROTTELEUR.
DEEP WELL PUMP.
APPLICATION FILED MAY 21, 1919.

1,388,602.

Patented Aug. 23, 1921.
13 SHEETS—SHEET 7.

Inventor:
Paul Charles Albert Rotteleur
By Attys

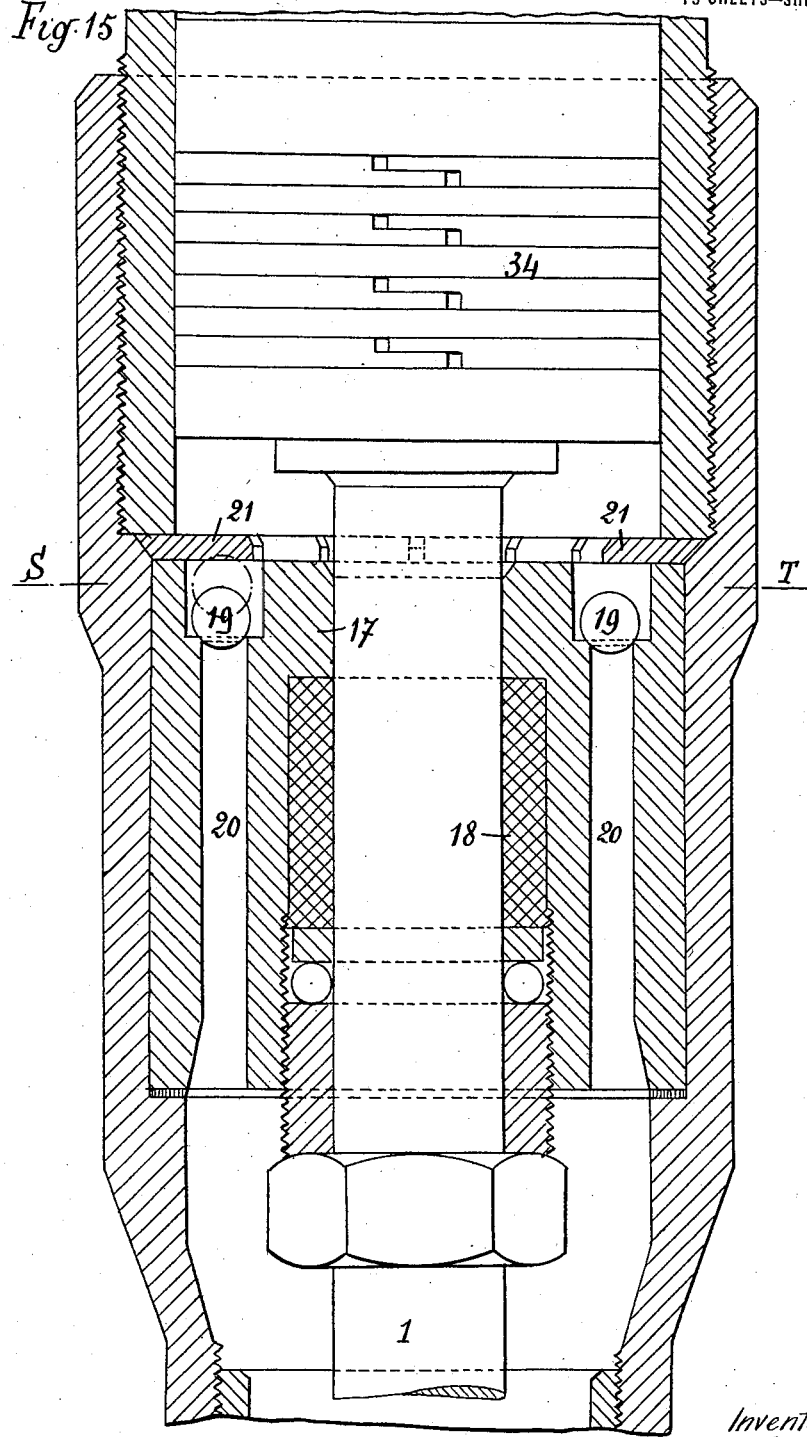

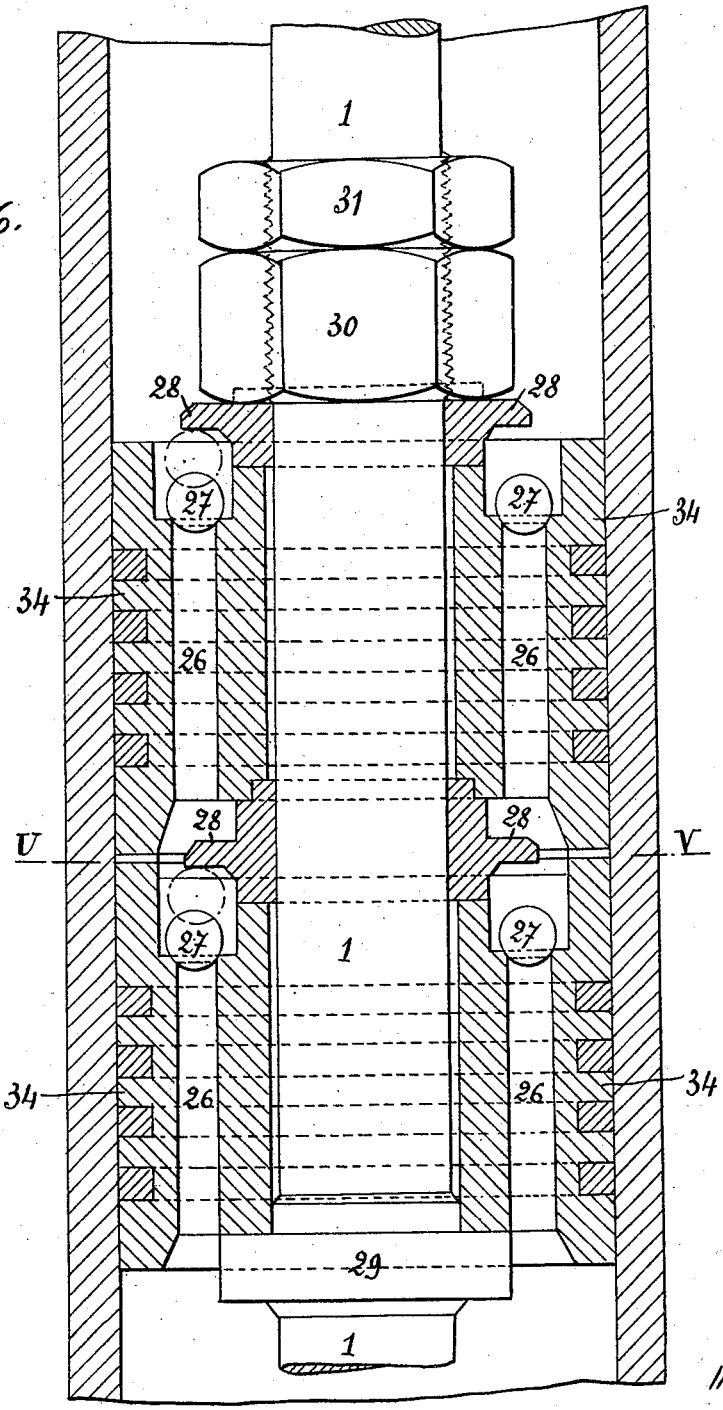

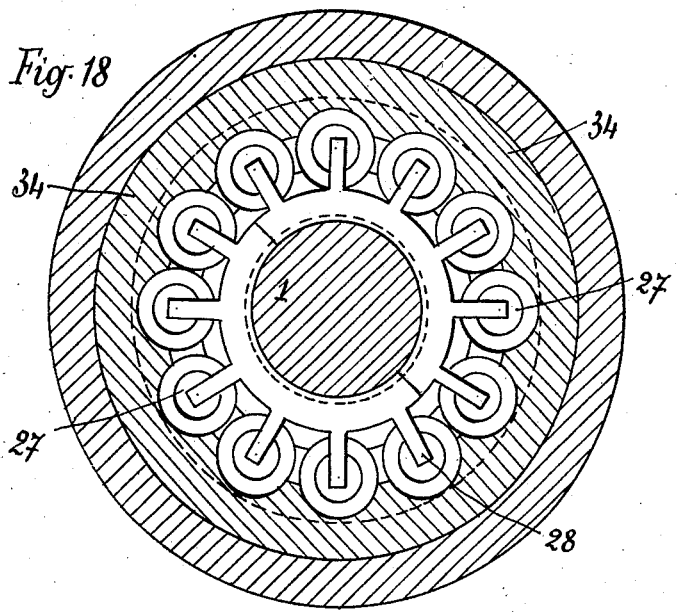
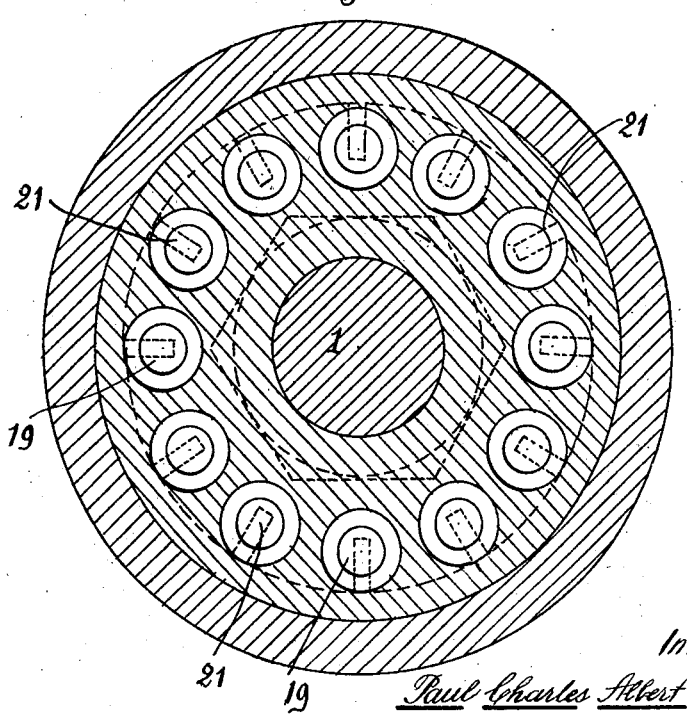

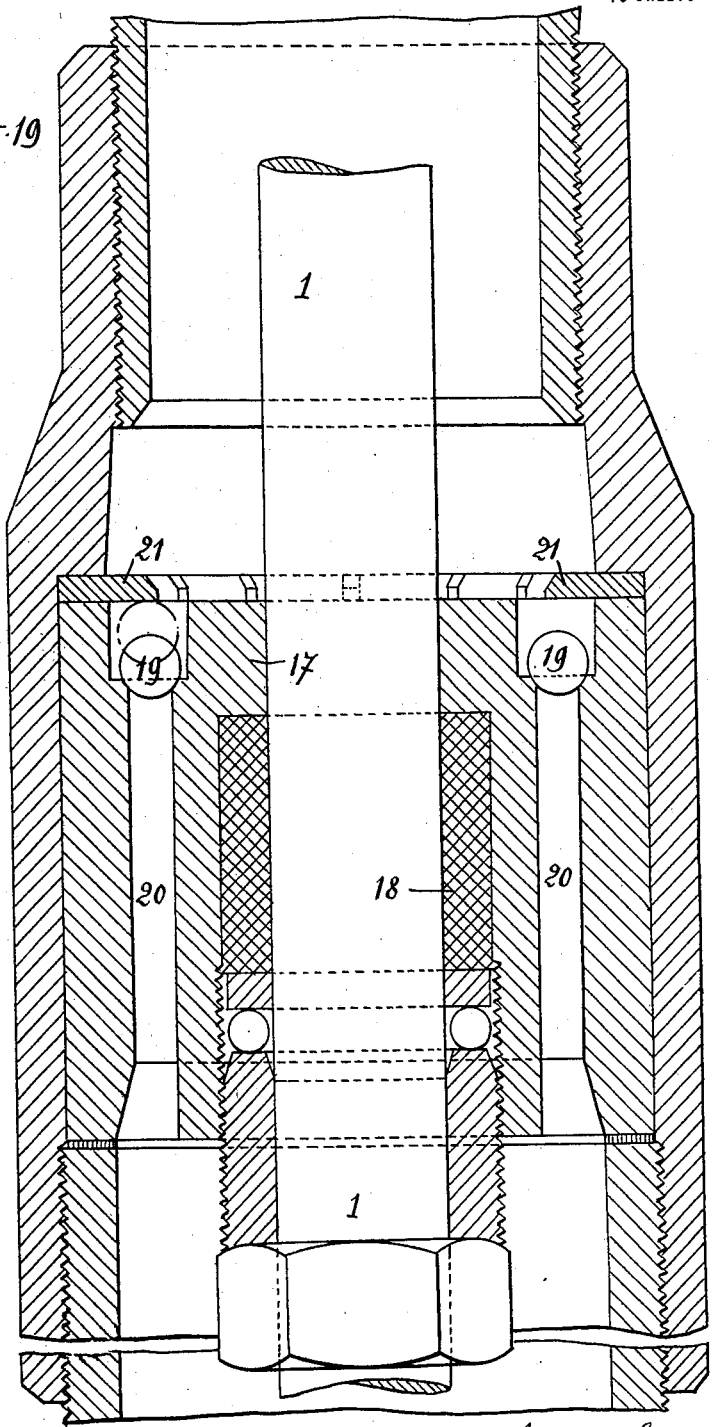

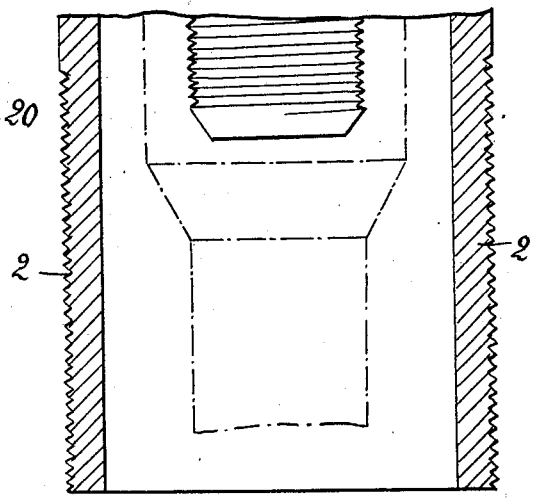
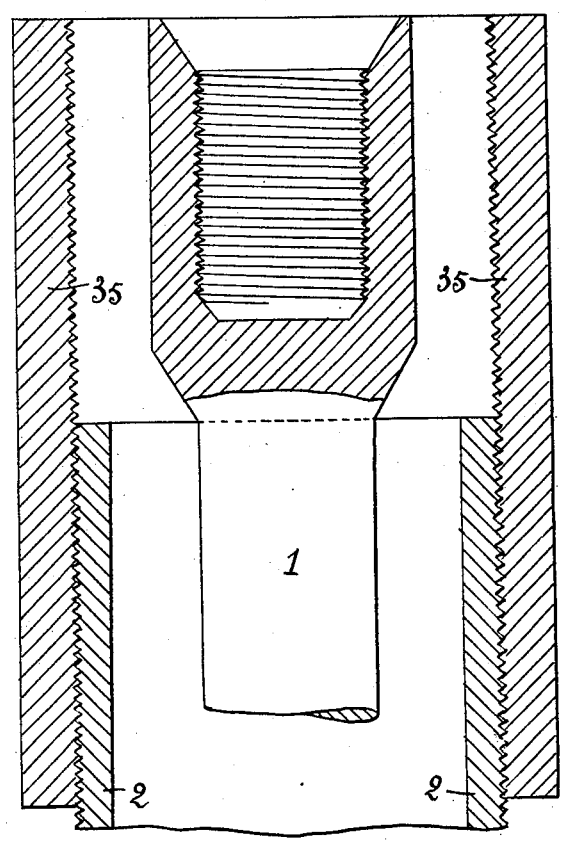

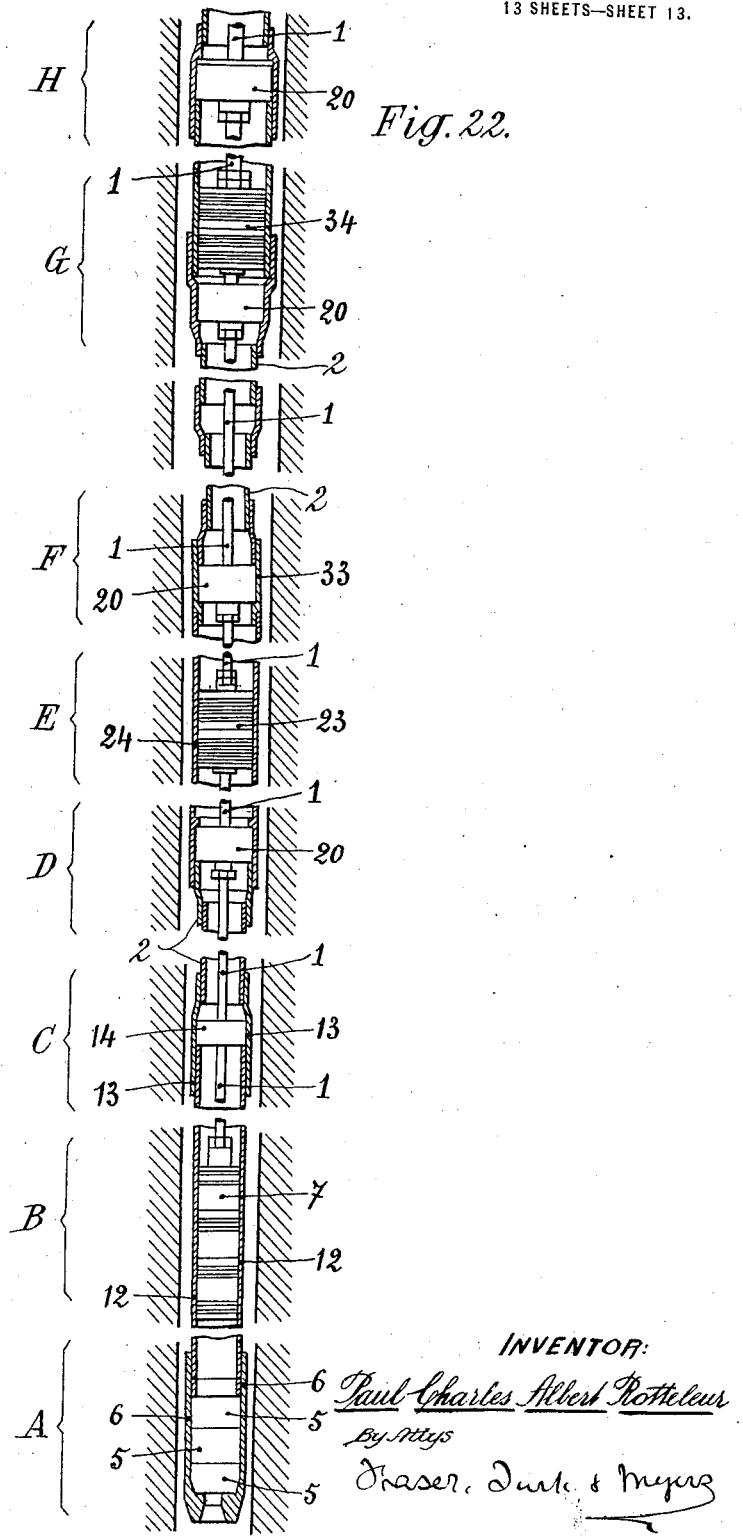

UNITED STATES PATENT OFFICE.

PAUL CHARLES ALBERT ROTTELEUR, OF MAURECOURT, FRANCE.

DEEP-WELL PUMP.

1,388,602.  Specification of Letters Patent.  Patented Aug. 23, 1921.

Application filed May 21, 1919. Serial No. 298,639.

*To all whom it may concern:*

Be it known that I, PAUL CHARLES ALBERT ROTTELEUR, a citizen of the Republic of France, residing at Maurecourt, par Andresy, Seine et Cite, France, have invented certain new and useful Improvements in or Relating to Deep-Well Pumps of which the following is a specification.

This invention relates to pumping liquids in general and particularly to pumping petrol, at great depths in borings of restricted cross section as low as ten centimeters in diameter at the base.

Experts are well aware of the difficulties to be met with when the beds being worked exceed a depth of some hundreds of meters below the ground.

The pressure per square centimeter at the base becomes considerable, sometimes fifty kilograms and more. Also the valves work badly, the contact surface in the pumping engines wears out and seizes; joints are destroyed and the smallest leakage quickly places the mechanism out of action. These drawbacks are well known particularly to those prospecting for petrol when the impoverishment of the surface beds obliges them to descend to deep levels.

The system of pumping according to this invention consists in dividing the height of the boring into successive compartments separated from one another by parts which are easily operated and in each of which the pressure at the base is determined by the limited height at the compartment under consideration. In this manner it will no longer be a matter of pumping liquid up to a height of 600 meters, for example, with a pressure of about 60 kilograms at the base, but to four heights of 150 meters each, in which the maximum pressure will scarcely reach 15 kilograms and in the case of petrol only 12 kilograms.

This number, 150 meters, has been mentioned because it represents the easiest conditions of many beds, especially of petrol beds. The size of the compartments may be considerably reduced whenever this is judged necessary.

The accompanying drawings show the parts and devices employed in the improved system, the figures commencing with those which are disposed at the base of the installation.

Figure 1 is a vertical section of the suction valve at the bottom of the installation, this figure being shown in two parts divided by the line A A; Fig. 2 is a horizontal section along the line C D; Fig. 3 is a vertical section shown in two parts connected along the line B B of the elevating piston; Fig. 4 is a vertical section of the piston head along the line E F of Fig. 5; Fig. 5 is a horizontal section taken along the line G H of Fig. 3; Fig. 6 is a vertical section of the guide of the elevating pump piston; Fig. 7 is a horizontal section taken along the line I J of Fig. 6; Fig. 8 is a vertical section showing the lower seat of the first relay; Fig. 9 is a horizontal section of the same taken along the line K L of Fig. 8; Fig. 10 is a horizontal section along the line M N of Fig. 8; Fig. 11 is a vertical section of the piston of the first relay; Fig. 12 is a horizontal section of the same taken along the line O P of Fig. 11; Fig. 13 is another horizontal section thereof taken along the line Q R; Fig. 14 shows in vertical section the upper seat of the first relay; Fig. 15 represents the lower seat of the last relay; Fig. 16 shows the piston of the last relay; Fig. 17 is a horizontal section of a retaining seat of the last relay taken along the line S T of Fig. 15; Fig. 18 is a horizontal section of the piston of the last relay taken along the line U V of Fig. 16; Fig. 19 is a vertical section of the upper seat of the last relay; Figs. 20 and 21 show details of mounting the tubes and the central rod. Fig. 22 shows on a reduced scale the assemblage of the parts shown in the preceding figures, the pump tube and cylinders being in section and the internal parts in elevation.

The system comprises a single rod 1 which is moved in the pumping tubes 2 as in all systems at present in use. At the base of the tubes 2 is located the elevating pump, which may be of any ordinary kind, with its piston (Figs. 1 to 7). This pump is arranged in a particular manner in the sense that the suction valves are triplicated like piston valves in order to insure proper function, because the entrance or admission of liquid into the pump depends upon the regularity of the functioning of the said valves, also to a great extent the total output of the system. The pump body has an interior diameter of six centimeters and all the parts are calculated to work at a pressure of at least 8 kilograms per square millimeter. Ball valves are preferably to other kinds of valves because the former are the least subject to derangement, a very important point for devices which have to be left to themselves and the repair of which is almost impossible when once they are placed in position. The holes 4 controlled by the suction valves 3 have a diameter of 0.030 m. and the balls a diameter of 0.040 m.

The said valves comprise three seats 5 superposed in a casing 6 screwed to the lower part of the pump body (Fig. 1). Between each two successive parts is inserted a packing of sheet lead of one mm. thickness at most, in order to form a joint. The same arrangement is preferably provided between all the fixed parts whether screwed or secured to one another in any other manner.

The elevating piston consists of four parts 7 screwed together, of which three form the seats 8 of the ball valves 9. The passages controlled by these valves have a diameter of 25 mm. and the balls a diameter of 32 mm. Each of these four parts 7 is provided with two metallic segments 10 forming the piston joint, thus 8 segments in all. It is however to be understood that any other system of joints might be employed if found convenient.

Figs. 1, 2, and 3 show that the course of the ball valves 3 and 9 is limited in an upward direction by stops 11 disposed at points forming the vertices of an equilateral triangle in order to avoid any obstruction of the action of the balls in the passage ways. The pump body measures 2.50 m. in height although the course of the piston does not exceed 1.10 m. The reasons for these dimensions will be given hereinafter.

The maximum external diameter of the assemblage is up to 92 mm. (at the valve casing), so that the whole can easily be passed into a boring of 100 mm. internal diameter. A reference to the accompanying drawings will render more ample explanations unnecessary.

At the upper part of the pump body 12 is disposed a coupling piece 13 (Fig. 6) in which the pumping tubes 2 are secured, these parts having for example, an internal diameter of 50 mm. and a thickness of 5 mm. throughout the first 300 meters starting from the bottom. Between the pump body 12 and the pumping tubes 2 a circular guide 14 is interposed (Figs. 6 and 7) pierced with a central hole for the passage of the rod 1 and with twelves holes 15 of 12 mm. diameter for the passage of the liquid. The object of this guide 14 is to insure the correct verticality of the elevating piston and the rigidity of its movement. The pumping tubes 2 are continued up to a height of 50 meters being the height of the first compartment in which the pressure at the base does not exceed 5 kilograms per square centimeter. At the top of this compartment the first relay is arranged constituting the foot of the second compartment. This relay is essentially composed of the following parts:—(1) a pump body having an interior diameter of 80 mm., a length of 2.50 m. and a thickness of 8 mm. In the interior a circular projection 16 (Fig. 8) is cast having a height of 15 mm. and a thickness of 5 mm., serving as an abutment for the support of the valve seat hereinafter described: (2) a lower seat 17 traversed by the rod 1 which passes through a stuffing box 18, and which seat comprises ten ball valves 19 controlling the passage of the liquid which is raised by the elevating piston; this seat is tubular and the reasons, which have been explained above, for adopting this system are that facility of upkeep may be provided and simplicity of construction insured.

Each ball 19 has a diameter of 12 mm., covers a passage 20 of a diameter of 9 mm., and is moved in a recess having a diameter of 16 mm. and a height of 15 mm. (see Figs. 8 to 10).

The horizontal section (Fig. 10) shows the arrangement of the seat and indicates that the balls 19 are retained in their recesses by the projections 21 of a radiating system, each of which corresponds to one ball while the recesses are interconnected by a circular drain path 22 which facilitates the flow of the liquid to the exit passages 20. Regarding the stuffing box 18, this may be formed of metal packing rings, square braids, stamped washers, or any other suitable construction may be employed. For the rest, an arrangement will hereinafter be described which enables all the parts which are to be employed to be tested at the desired pressures, by placing them under the actual conditions in which they have to operate. (3) Of a double piston 23 (Figs. 11 to 13) having a diameter of 80 mm. (like the pump body 24), analogous in a general way to the retaining seat which has just been described. The piston 23 is doubled in order to insure continuity of service and each part comprises four metal packing rings 25 designed to make the assemblage liquid tight. As in the case of the lower seat the pistons 23 are traversed by the opening 26 having a diameter of 9 mm. closed by balls 27. The balls and recesses are also similar but in the present case the system of stop for the balls is formed by a star with ten points 28, one point per ball (Figs. 11 and 13).

The pistons 23 are passed over the upper end of the rod 1 and rest upon a shoulder 29 (Fig. 11) forged together with the rod; between the two pistons a lead washer makes a joint as stated above. Above the piston is arranged a fixing screw 30 with lock-nut 31 screwed upon an enlargement or boss of the rod 1. In order to clear this boss the pistons are provided with a recess 32 the hollow of which corresponds to the boss. The pistons 23 are maintained in their position by the shoulder 29 of the rod 1 and by the retaining stars with ten points 28 which are secured in the centers of the pistons. For this purpose the stars 28 are made in halves separated along a diametral longitudinal plane, Fig. 13, and applied directly upon the piston rod. Gudgeons fix them in position upon the center of the piston.

The total length of the piston rod is 4.85 m., that is to say, twice as long as the pump body 24, or at least twice the length of stroke possible plus the height of the valve casings, above and below, and plus the passing ends of the rod above and below.

(4) Of an upper seat (Fig. 14) analogous at every point to the lower seat and which, like the latter, is contained in a special casing 33 screwed upon the pump body 24 and which constitutes the junction between the pump body and the pumping tubes which are above it and form the second compartment. The first pumping tube in penetrating into the junction box by a suitable joint maintains the second seat in its position above the pump body. There again the lead washers should be provided in order to make a liquid tight and secure joint.

Fig. 14 shows the function of the upper seat and completes the description of the relay.

The external diameter of the assemblage does not exceed 96 mm. and can the more easily pass into an opening of 100 mm. since the height of the projecting parts does not exceed three meters, the remainder of the compartment being formed of tubes having a much smaller external diameter.

*Operation.*—It has already been explained above that the base elevating pump comprises a pump body 12 having a diameter of only 6 centimeters. But the pump body of the first relay (Fig. 11) has a diameter of 8 centimeters and the respective cross-sections are 28 square centimeters (26) for the lower pump and 45 square centimeters (44 after deducting the cross sectional area of the piston rod) for the relay pump. It follows that the stroke being the same at every part the volume displaced by the piston 23 of the relay is equal to 1½ times the volume displaced by the piston 7 of the pump. The volume displaced by piston 23 equals one and one-half times the volume displaced by piston 7 which is of a correspondingly smaller diameter than that of piston 23, so that the liquid on entering the relay from piston 7 will not strike the lower face of the piston 23. The length of the common stroke has been fixed at 1.06 m. so as to complete the volume of about three liters for each suction. When the ascending stroke ends the liquid will be lifted only 0.65 m. in the relay, $$1.06 \times \frac{28.25}{45.44} = 0.65 \text{ meter},$$

whence there will be a vacuum or at least an empty space of 0.41 m. under the piston.

The piston again descending, meets the liquid which traverses and passes above it. The movement continuing the piston again rises and forces above the upper seat (which terminates the pump body) the charge of three liters which it has just received whereupon the piston descends empty and there is a vacuum both above and below the piston; consequently there is a complete interruption between the two compartments considered.

The pressure of the upper compartment has no effect upon the lower compartment and thus the desired result aimed at is obtained.

The same arrangement could be repeated with the same dimensions at different heights of the pumping column. The same result will always be obtained by dividing the height into independent compartments because each suction only produces three liters of liquid and the liquid will never be raised more than 0.65 m. in the pump bodies when their pistons have a stroke of 1.06 m.

There is however a limit to the resistance of the metal and it is to be noted that the load upon the rod 1 increases as it rises. The diameter which was 20 mm. for the first compartments becomes successively 25 mm., 30 mm., 35 mm., and even 40 mm. The other parts, the tubes, the pump bodies, the junction casings, are subject to the same law, this being necessitated by the requirements of the mounting. Hence it may be convenient to modify the dimensions of certain parts constituting the mechanism without modifying their type or the principle of their operation. Hence it has been shown in Figs. 11 to 19 that all the data of the problem can be provided for without it being necessary to repeat here the detailed description. It may merely be mentioned that the number of the passages 20 in the upper seat of the last relay, Figs. 15 and 17, and those 26 in the piston 34, Figs. 16 and 18 has been increased as much as possible in order to diminish the resistances, also that the increase of diameter of the pump bodies has the effect of increasing still further the conditions which cause the interruption in the stroke of the column by rendering more pronounced the difference between the volumes acted upon.

It is obvious that the external diameter of the pump bodies increases in the same proportions but not to the point of creating an obstacle or merely an appreciable difficulty in the application of the process. It is to be understood that the diameter of the borings increases also in rising from the base to the surface. A boring of 900 m. depth has commonly a diameter of at least 25 centimeters in open daylight, 15 centimeters at the depth of 400 meters and finishes with 10 centimeters at the bottom. The two types however which are represented have respectively an external diameter of 96 mm. and 140 mm. and in the boring which is under consideration having a depth of 900 meters, they would be situated at the respective depth of 600 meters for the least powerful and of 150 meters for the most powerful, so that there would be no fear of danger.

*Execution.*—Experience has shown that the construction and the adjustment of the different parts which have just been described should be carried out with the greatest care. It is in fact a work of precision almost like that of clock work. The progress achieved in the steel industry, however, enables these conditions to be easily fulfilled. The quality of the metal should be high, equal in fact to high resistance steel. It would be a fatal error to seek to economize in the quality of the materials for the installation of apparatus or mechanisms which are designed to undergo considerable strains under forcibly restricted volumes and to work without any possible maintenance far from all supervision. It is precisely by reason of these difficulties of supervision and maintenance that only 8 kilograms of resistance is imposed upon the steel whatever its actual quality may be, the same for the tubes and also for the pump rods, junction boxes, and other parts.

In erecting the installation it will be necessary to deal with the parts successively rod by rod, tube by tube, first a rod and then a tube alternately. The presence of the relays at the foot of each compartment no longer permits of proceeding according to the ordinary method which consists in placing first the pump tube preceded by a single pump body, then descending afterward to the series of pump rods carrying the elevating piston. It is in fact necessary in this case to proceed as stated, article by article. For this purpose it is advisable to make the rods and tubes of substantially equal lengths, that is to say, effective lengths taking into account the respective surfaces of each piece, tube or rod, in such a manner that the free ends are about on the same level. The tubes should be connected beforehand two by two by external rings 35 (Fig. 21) having a thickness greater than that of the tubes by two millimeters. In order to gain time it is necessary to employ a system enabling a tube and a rod to be raised at the same time, one containing the other, then to hold the tube in proper relative position by means of a collar, then to screw the rod and afterward to screw the tube. It is merely a question of getting used to the operation and also a matter of carefulness.

When one compartment is finished and a fresh relay is reached forming the base of the following compartment the pump body of the new relay should previously be equipped in the downward direction with the portion of tube which will connect it to the column. Otherwise it would be impossible to place this portion of the tube in position.

It is necessary to be very careful that the tube passes beyond the lower end of the piston rod by a certain amount, the piston referred to being that contained in the pump body and which rests upon the lower seat of the relay which is about to be erected. After this the procedure is as follows: The pump rod which is within the tubes already placed in position is raised and is held in raised position upon the edge of the tube (it is advisable to employ a plate of copper or of lead in order not to alter the pitch of the screw of the tube). The piston rod which was referred to just above is then screwed upon the pump rod which was raised in the manner described, whereupon the pump rod is relieved from above and is disengaged from its holding device; the pump body is allowed to slide so as to enable it to be screwed by its tube upon the column; finally the pump rod is allowed to descend gently until by means of the piston it is placed upon the lower seat of the pump body, as will readily be understood from Figs. 20 and 21.

It is always necessary that, whatever stage of the mounting is being dealt with the pump rod should rest solely upon the relay forming the base of the compartment in course of construction, that is to say, upon the last relay sunk. In this manner when a start is made it will only be necessary to regulate the movement in the last relay, the movement in the other relays necessarily conforming thereto without involving any shock at the ends of the stroke.

For this reason the pump bodies have been given a length which may appear exaggerated, namely, 2.50 m. to the first and 2.30 m. to the others.

*Output.*—In the preceding paragraphs and particularly in the immediately preceding ones, care in construction in erecting the mounting, and in the finish of the execution have been insisted upon as all these factors affect the inherent expensiveness of the system proposed. An installation of this kind must necessarily be somewhat costly but it is claimed that the output obtainable therefrom is worth the expense.

In order to reply to the question of the expense involved it is convenient to meet this with another which must be answered before all. This latter question concerns the speed upon which the operation of the engine depends, also the speed of the liquid.

What is the limit of the speed of flow of the liquid in the different channels which it has to traverse before reaching the surface? The maximum speed of three meters per second has been adopted at the most restricted points of the tube systems, taking into account the fact that these passages are extremely short, the height of a retaining seat or of a half-piston may be ten centimeters at the most.

A cursory examination shows that the maximum speed is realized in the upper seat, namely, that of the last relay, and that this maximum is due less to the constriction of the tube system than to the fact that the passage of the liquid through the said system has to be effected during a reduced portion of the stroke, the portion being the more reduced as the liquid is raised a smaller extent within the pump body. It is known that this is the factor which determines the interruptions in the pumping column and which has been set forth as the principle of the invention.

Considering the last relay, the annular surface is here 68 square centimeters (the diameter of the pump body being 100 mm., of the rod 35 mm., see Fig. 16), whence the annular surface equals $\frac{\pi}{4}(100^2-35^2)=68$ square centimeters. The sum of the tubular sections is $12 \times \pi \times (4.5mm.)^2 = 7.6$ square centimeters; the liquid the volume of which is always three liters at each stroke of the pump will be lifted to $\frac{3000}{68}=44$ centimeters, only in the pump body, which repsesents $\frac{44}{106}$ths of the stroke, about $\frac{2}{5}$ths less than the half.

If $t''$ represents the time of the stroke the passage of the three liters of liquid should be effected in $\frac{44}{106}$ths of $t''$ and in one second it will pass $$\frac{3000 \text{ c.c.}}{\frac{44 t''}{106}} \text{ or } \frac{3000 \times 106}{44 t''}$$

In order to obtain the speed per second it only remains to divide this quantity by the cross section of the passage, that is to say, by the total of the tubular cross sections which is 7.6 square centimeters. The quotient will give the speed in centimeters.

$$\frac{\frac{3000 \times 106}{44 t''}}{7.6} = v.$$

Dividing by 100 in order to express the speed in meters we get:

$$\frac{3000 \times 106}{100 \times 44 \times 7.6} = \frac{318000}{33440} = 9.5 = vt.$$

This formula, in the case of the upper seat, connects the speed of flow of the liquid with the speed of pumping. It is the equation of an equilateral hyperbola referred to its asymptotes.

If the equation is applied to the data of the lower seat in which the diameter of the pump body is 80 mm., that of the rod 20 mm. only, the constant modulus of the first member becomes:

$$\frac{318000}{40068} = 7.9 = vt.$$

This shows that the modulus of the hyperbola passes from 7.9 to 9.5 in going from the first of the last seat taking an increasing value from one seat to the other, or from seat to seat; which again shows also that for one and the same time of stroke the maximum speed of circulation of the liquid is produced in the upper seat.

Being given these conditions, the examination which has just been made indicates that in order to obtain the conditions of a speed of about 3 meters per second and often somewhat lower it is convenient to make $t=4''$. Then $v$ will vary from 1.97 m. to 2.35 m., from the first relay to the last, a condition which is quite admissible.

Thus the pump will make a complete stroke in eight seconds, $4''$ for the ascent, $4''$ for the descent; with a speed of 0.625 m. at the rod. This gives three liters for eight seconds, or 1350 liters per hour and 32400 liters per day.

If an output of 75% only is adopted, since in spite of all care the difficulties of leakage must be reckoned with, an output of practically 24 cubic meters per day can be counted upon.

A higher output might be obtained without any great increase of expense, for example, if the boring retained an internal diameter of 12 centimeters as far as the bottom or if experience showed that the speed of pumping could be carried to 10 strokes per minute without prejudicing any part that is three seconds for each oscillation. With the same co-effifficient of output the daily yield would rise to 30 cubic meters and more. The co-efficient of output which has been estimated at 75% could vary often in the direction of being more rather than less. It is evident that it would be advantageous to have a means of control enabling the influence of these variations to be studied; hence a control apparatus adapted for making tests will now be described.

*Apparatus for control and for tests.*— The following arrangement is designed with a view to testing all the parts of the pump by making them operate in the conditions under which they will actually work and under the pressure and at the speed to which they will be submitted in practice. In this manner it will be possible to test each retaining seat, piston stuffing box, metallic ring and the like and by making them work for a sufficient time it will be possible to bring them into condition to give the best possible output.

These tests can be carried out during the execution of the boring for which the pump is designed, in such a manner as only to place into position a part or device which has given satisfaction.

This arrangement consists essentially of a pressure accumulator in which the liquid is forced at a pressure corresponding to that of the relay in which the part under observation will have to work.

The complete pump body provided with its lower jointing tube and with the elevating pump adapted by special springs is placed in a water tight passage of the boring provided with a tube of 40 centimeters (ordinary boring tube), ten meters deep and is filled with the liquid exploited by the undertaking. In order to test the lower seat and the piston of the relays the elevating pump is stopped. A driving system actuates the rod of the pump body in the same conditions of actual work, stroke, speed and the like.

The description of this arrangement is sufficient to enable the same to be understood and there would be no advantage in referring to any drawing, which would not add any clearness thereto.

The pump body is surmounted by a casing which replaces the ordinary tubes and from which extends a tube having a diameter of from 25 to 30 mm. communicating with the pressure box of the accumulator for forcing the liquid. This casing is provided with a stuffing box for the passage of the pump rod.

The liquid thus forced determines at each stroke an ascending movement of the accumulator. If this movement is regular, uniform, and corresponds well to the state of the surfaces this shows that the parts submitted to the test are in good condition.

If the case is otherwise, there is a discrepancy between the theoretic movement and the actual movement produced and this will be discovered by examining what takes place during the descent of the piston. If the liquid bubbles when the level rises in the reservoir, and it is easy to prove the fact by the aid of a float, this is because the lower seat leaks. If, the piston being stopped at the lower end of the stroke, the accumulator shows a movement of descent, it is probable that the upper seat is defective. Finally, if any of these accidents do not happen, but nevertheless the movement of the accumulator is insufficient, it is because the piston itself does not operate properly. In that case, having remedied as far as possible these defects, corrected the errors of mounting or of construction it will be a good thing to make the relay work for several entire days with the aid of a return tube having a control cock inserted therein enabling the liquid to pass from the accumulator into the reservoir in order to verify the behavior of the glands, stuffing boxes, metallic rings, and to compare with them the different systems and to regulate them definitely before placing the installation in service. This would also be the best way of proving the value of the co-efficient of output which has been arbitrarily fixed at 75% as a minimum, the best way also of determining the maximum useful speed to give to the pump rod. It is necessary to carry out these experiments, which are considered to be indispensable during the execution of the boring itself in such a manner as not to cause any loss of time before starting up and to benefit therefrom during subsequent working.

What I claim and desire to secure by Letters Patent is:—

1. An apparatus for raising liquids from borings of considerable depth, comprising a column and successive pumps of unequal capacities with their pistons connected to a single rod for simultaneous reciprocation, the inlet to the column being beneath the bottom pump, whereby the liquid being pumped passes serially through the successive pumps, a pump thereof comprising a pump piston in sections fastened upon the pump rod, each section having a central opening for the rod, and lateral passages for the liquid, said passages enlarged to form valve chambers, and valves therein, and the sections having valve stops for limiting the lift of the valves.

2. Apparatus according to claim 1, with annular collars superposed upon the respective sections, said collars carrying the said valve stops.

3. Apparatus according to claim 1, with an annular collar confined between successive sections, said collar carrying the valve stops for the valves of the sections.

4. Apparatus according to claim 1, each pump piston section having a central opening for the rod of larger bore than the body of the rod, divided collars fitting the rod, and having annular engagement with the sections whereby they are held concentrically upon the rod, and means for clamping the piston sections upon the rod.

In witness whereof, I have hereunto signed my name in the presence of two subscribing witnesses.

PAUL CHARLES ALBERT ROTTELEUR.

Witnesses:
CHAS. P. PRESSLY,
RENÉ BARDY.